(12) United States Patent
Lindgren

(10) Patent No.: US 6,620,014 B1
(45) Date of Patent: Sep. 16, 2003

(54) COMMUNICATING RADIO PLANNING INFORMATION AMONG CONTROL NODES IN A CELLULAR COMMUNICATION NETWORK

(75) Inventor: Magnus Lindgren, Linköping (SE)

(73) Assignee: Telefonaktiebolaget LM Ericsson(publ), Stockholm (SE)

(*) Notice: Subject to any disclaimer, the term of this patent is extended or adjusted under 35 U.S.C. 154(b) by 0 days.

(21) Appl. No.: 09/218,065

(22) Filed: Dec. 21, 1998

(51) Int. Cl.[7] ................................................. H04Q 7/20
(52) U.S. Cl. ....................................... 445/446; 445/447
(58) Field of Search ................................. 455/446, 447, 455/575, 450, 435, 448, 462, 458, 434, 451, 460, 452, 62, 63, 463

(56) References Cited

U.S. PATENT DOCUMENTS

| 5,408,419 A | 4/1995 | Wong .......................... 364/514 |
| 5,455,821 A | 10/1995 | Schaeffer et al. ............. 370/17 |
| 5,506,837 A | 4/1996 | Söllner et al. ................ 370/31 |
| 5,506,867 A | 4/1996 | Kotzin et al. ............... 375/220 |
| 5,682,416 A | 10/1997 | Schmidt et al. ............... 379/58 |
| 5,722,074 A | 2/1998 | Muszynski ................... 455/442 |
| 5,732,353 A | 3/1998 | Haartsen ...................... 455/450 |
| 5,918,182 A | * 6/1999 | Korus et al. .................. 455/517 |
| 5,966,657 A | * 10/1999 | Sporre ......................... 455/425 |
| 6,049,717 A | * 4/2000 | Dufour et al. ............... 455/446 |
| 6,112,082 A | * 8/2000 | Almgren et al. ............ 455/425 |
| 6,128,473 A | * 10/2000 | Ritzen et al. .................. 455/63 |
| 6,157,811 A | * 12/2000 | Dent ........................... 455/12.1 |

FOREIGN PATENT DOCUMENTS

| EP | 0838964 | 4/1998 | ............ H04Q/7/34 |
| EP | 0847213 | 6/1998 | ............ H04Q/7/36 |

* cited by examiner

Primary Examiner—William Trost
Assistant Examiner—Naghmeh Mehrpour
(74) Attorney, Agent, or Firm—Jenkens & Gilchrist, P.C.

(57) ABSTRACT

In a cellular communication network, radio planning information is provided in a first control node that controls a plurality of first fixed-site radio transceivers which define a plurality of first cells in the cellular communication network. Without network operator support, the radio planning information is communicated from the first control node to a second control node that controls a plurality of second fixed-site radio transceivers which define in the cellular communication network a plurality of second cells including at least one second cell that is located adjacent to at least one of the first cells.

24 Claims, 6 Drawing Sheets

| Message | (Parameters) |
| --- | --- |
| CellInfoChange | (CellID, NeighborCellID, ChannelNo, DigitalVerificationColorCode) |
| SystemInfoChange | (SID, NetworkType) |
| AddNeighborCellRelation | (CellID, NeighborCellID) |
| RemoveNeighborCellRelation | (CellID, NeighborCellID) |

*FIG. 3*

COMMUNICATING RADIO PLANNING INFORMATION AMONG CONTROL NODES IN A CELLULAR COMMUNICATION NETWORK

FIELD OF THE INVENTION

The invention relates generally to cellular communication networks and, more particularly, to radio planning in cellular communication systems.

BACKGROUND OF THE INVENTION

Radio planning algorithms are conventionally used in cellular networks, for example, to allocate frequencies to cells. The current trend is to implement increasingly more adaptive radio planning algorithms which permit the radio planning to be done automatically, without requiring manual operations. Adaptive algorithms are also conventionally used to generate cell neighbor lists automatically. Another example of radio planning operations is the setting of signal strength levels.

Some information produced by adaptive radio planning algorithms is needed not only in the node that controls a given base station and cell, but also in neighboring nodes which control neighboring base stations and cells. In the AMPS and PDC standards, the Mobile Services Switching Center (MSC) is exemplary of such control nodes. In the GSM standard, the Base Station Controller (BSC), is exemplary of such control nodes. A cell on the border between two adjacent groups of cells controlled by separate control nodes typically needs information about one or more cells on the other side of the border (in the adjacent group), for various reasons including enabling a mobile station to be handed off efficiently across the border from one border cell to another. In the handoff situation, the current cell needs to know the appropriate control channel frequency of the handoff target cell. Another example reason for exchanging information between cells on either side of a border is to provide a fast way of finding candidate cells for camping.

Many conventional cellular systems (or networks) perform centralized radio planning, including use of adaptive algorithms, in the Operating Support System (OSS). The OSS communicates the radio planning information to the various control nodes, including communicating relevant portions of one control node's information (for example, border cell information) to another control node, and vice versa. However, disadvantageously, there is no industry-wide standard for communications between OSS and control nodes such as MSCs and BSCs, so the radio planning information is basically updated (i.e., by a network operator) from OSS to the appropriate control nodes.

As the size and complexity of cellular systems increases, the number of borders between cell groups controlled by separate control nodes (and thus the number of border cells) increases. For example, a local office network typically includes a plurality of cells controlled by a control node referred to as a local office network switch. As more local networks are established, the number of borders and border cells increases. These border cells border either cells of other local office networks or cells in systems other than local office networks. With the above-described increasing complexity, the complexity of implementing centralized radio planning (for example, centralized adaptive channel allocation, ACA) in OSS also disadvantageously increases. Moreover, the amount of communications between the OSS and the various control nodes disadvantageously increases.

Some conventional arrangements, for example private networks such as local office networks, permit the radio planning to be decentralized such that each control node performs some of its own radio planning locally rather than receiving it from OSS. However, frequency (e.g., broadcast control frequency) assignments for border cells are set manually (and hence non-adaptively) by the network operator. Changes of frequencies in border cells are then communicated by the network operator to the control nodes associated with the bordering cells. Adaptive frequency allocation for border cells is not conventionally performed by the local control nodes due to fears of network problems that could result. For example, other bordering cells would be immediately affected by any locally originated frequency changes in a given border cell, but conventional network architectures are not capable of immediately providing the frequency changes to the relevant control nodes.

It is therefore desirable in a cellular communication system to provide for more immediate communication of locally originated border cell information to control nodes of bordering cells. This is achieved according to the present invention by communicating the border cell information over conventionally existing communication paths already coupled between control nodes in conventional cellular systems. This permits, for example, a given control node to assign locally its own border cell frequencies, and then report these frequency assignments to the relevant neighboring control node(s).

BRIEF DESCRIPTION OF THE DRAWINGS

FIG. 3 illustrates exemplary messages that can be used for communication according to the invention among the control nodes of FIGS. 1 and 2.

DETAILED DESCRIPTION

Figure 1:
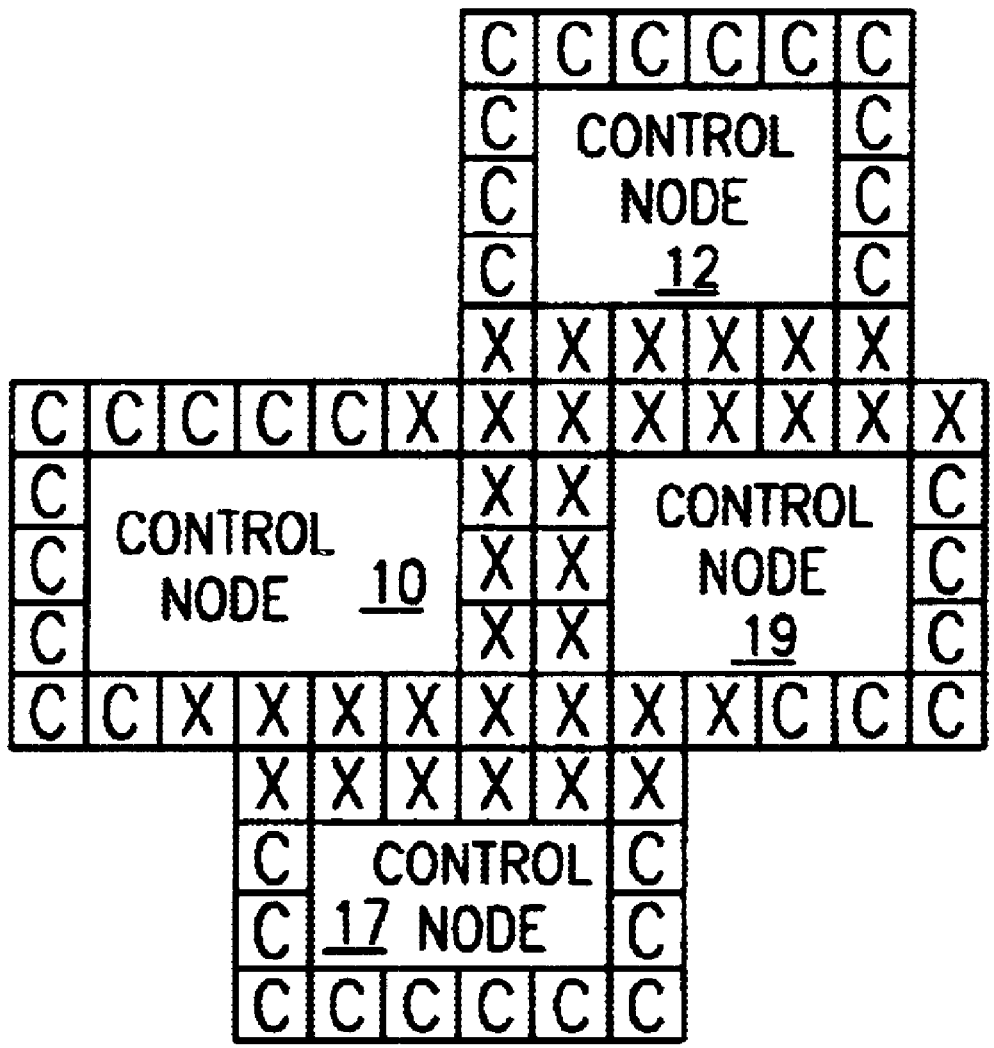
FIG. 1 illustrates diagrammatically of a cellular communication system in which the present invention can be implemented.

FIG. 1 illustrates diagrammatically an example cellular communications system (or network) in which the present invention can be utilized. The example of FIG. 1 includes a plurality of control nodes, for example MSCS, BSCs or local office network switches. Each control node of FIG. 1 is shown surrounded by a plurality of cells which it controls. Each cell is a geographical area defined by one or more fixed-site radio transceivers coupled to and controlled by the associated control node. In FIG. 1, border cells are designated by X and non-border cells are designated by C. One or more of the control nodes and associated cells illustrated in FIG. 1 could represent, for example, a local office network.

Figure 1A:
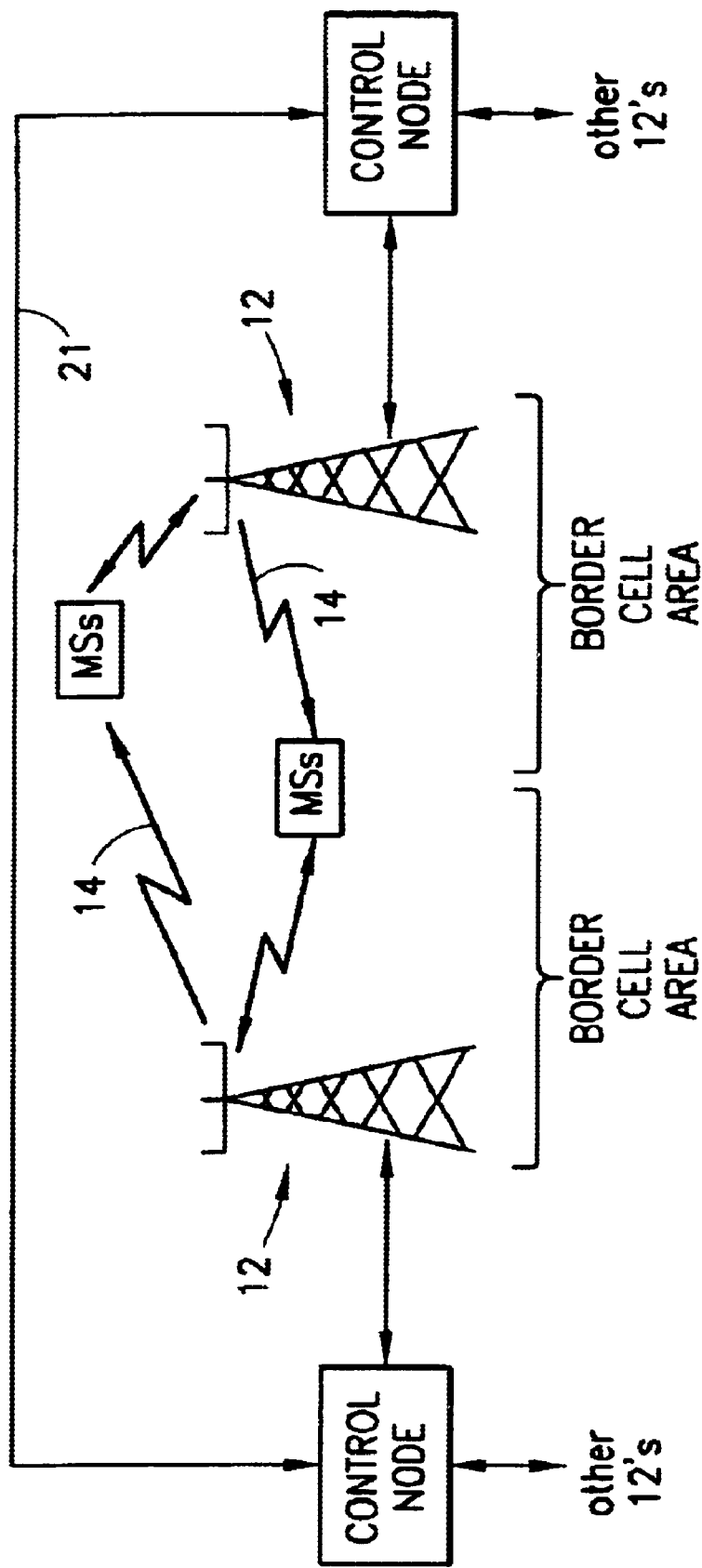
FIG. 1A illustrates diagrammatically an exemplary pair of border cells from FIG. 1.

FIG. 1A illustrates diagrammatically an exemplary arrangement of a pair of neighboring border cells from FIG. 1, controlled by different control nodes. Each fixed-site radio transceiver 12 conventionally provides radio telecommunications service to a plurality of mobile stations MS within the associated border cell. A base transceiver station (BTS) in a GSM network is one example of such fixed-site radio transceivers 12. The mobile stations MS operating in each cell also monitor, for example, a broadcast control channel of the fixed-site radio transceiver 12 of the bordering cell (e.g., for handoff determination purposes), as shown at 14 in FIG. 1A. The arrangement of FIG. 1A, wherein mobile stations of each cell monitor a broadcast control channel of the neighboring cell, is illustrative of a conventional "neighboring cell relationship" between two cells.

Figure 2:
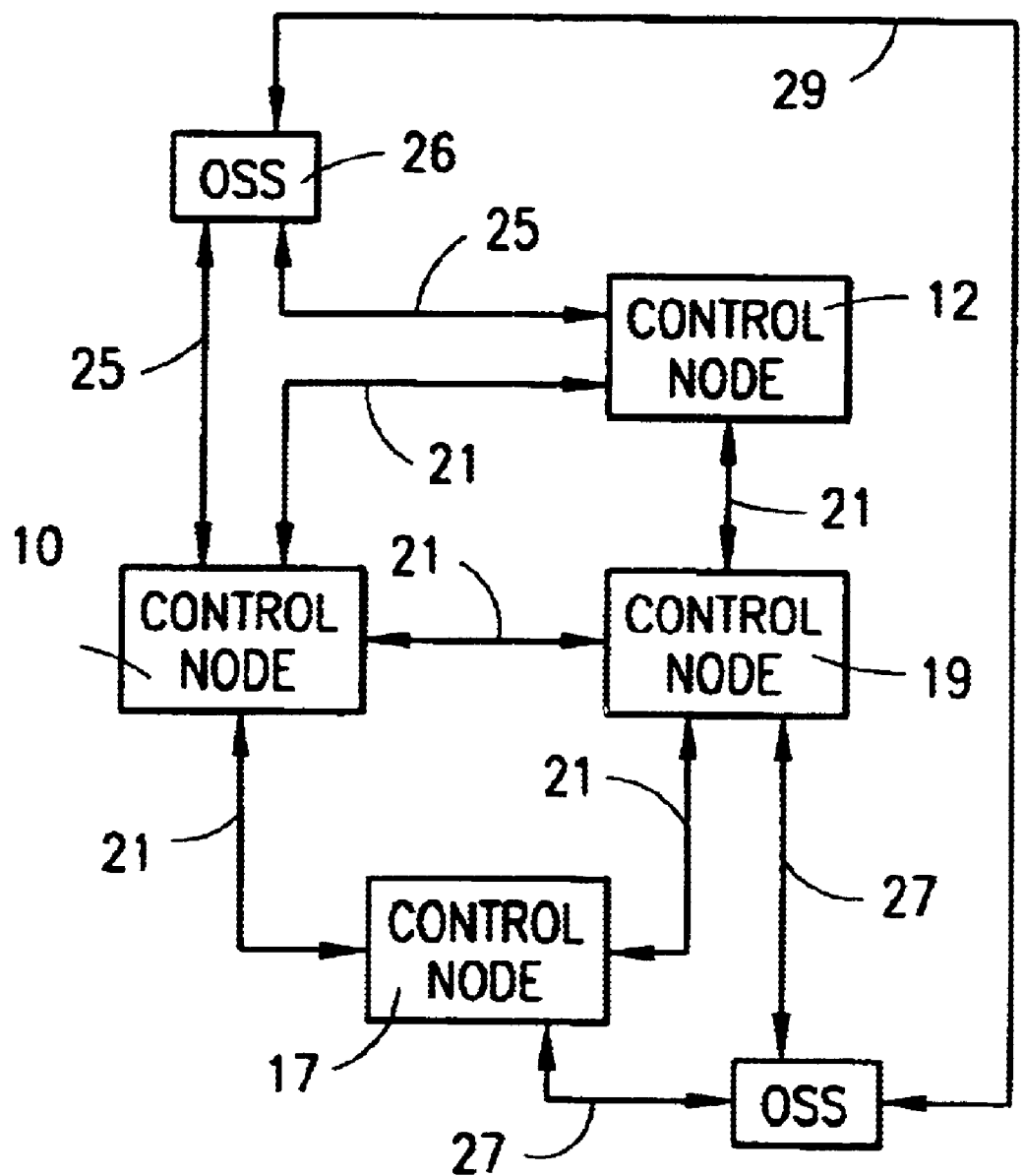
FIG. 2 illustrates diagrammatically example communication links which connect the control nodes of FIG. 1 and which can be used to implement the invention.

FIG. 2 is similar to FIG. 1 but illustrates the control nodes without the associated cells in order to clearly present the communication paths utilized by the present invention to communicate radio planning information among the control nodes. The communication links 21 couple the control nodes for communication with one another. Such communication links or trunks are conventionally used by the control nodes, for example, for transmission of user traffic signals and inter-MSC handoff signaling information, call initiation and routing, coordination of MSC services, and providing automatic roaming features. The communication links 21 are conventionally provided as SS7 links using conventional Mobile Application Part (MAP) protocols (for AMPS/D-AMPS, GSM and PDC standards). Examples of such links for AMPS/D-AMPS systems are specified in interim standard IS-41. However, the present invention is not limited to SS7 links, but could also utilize other types of conventional communication links as well, for example, TCP/IP.

The communication links 21 are used according to the present invention to communicate from one control node to another information relative to one or more cells on the boundary between those control nodes. Thus, each control node can perform adaptive radio planning algorithms locally and then communicate relevant results (such as border cell information) to the neighbor control nodes without any involvement by OSS or an operator. Also, results of centralized radio planning algorithms, received at a given control node from OSS, can be communicated from that control node to a neighboring control as needed node without using OSS or an operator.

FIG. 2 also illustrates communication links 25 connecting control nodes 10 and 12 to OSS 26, and communication links 27 connecting control nodes 17 and 19 to OSS 22. This illustrates that neighboring control nodes such as nodes 10 and 17 may not even use the same operator and associated OSS. The communication links coupling the control nodes to the operators, such as at 25 and 27, are well known in conventional cellular communication arrangements, but are not always standardized in structure and operations. OSS 26 can be coupled to OSS 22 via a conventional communication link at 29.

When a control node recognizes, in any conventional manner, a new neighboring cell relationship between its own border cell and a neighboring border cell of a neighboring control node, the control node can communicate information indicative of this new relationship directly and immediately to the neighboring control node via the appropriate communication link 21. Similarly, when a control node recognizes that an existing relationship between border cells should be removed, for example removal of an existing neighboring cell relationship when a predetermined percentage of handoff attempts have failed, this information can also be communicated directly and immediately to the neighboring control node via the appropriate communication link 21. As mentioned above relative to FIG. 1A, two cells are conventionally considered to have a "neighboring cell relationship" when each cell knows a broadcast control channel frequency of the other cell, and can direct all of its mobile stations to monitor that frequency to determine whether handoff is desirable.

When a control node changes information for one of its border cells, and that information is important for a border cell of a neighboring control node, such as a change in a broadcast control frequency or digital verification code, then this information can be communicated directly and immediately to the neighboring control node. Similarly, when one control node changes information used within that control node for operations thereof, and that information is important for a neighboring control node, for example the System Identity (SID) code in an AMPS/D-AMPS control node could be changed by order from the OSS, then information indicative of the change can be communicated directly and immediately to the neighboring control node.

Considering the aforementioned example wherein a locally originated change in a broadcast control frequency of a border cell can be communicated directly and immediately to a neighboring control node, such immediate communication between control nodes permits the control nodes locally to perform adaptive frequency allocation for their own border cells without conventional fears of network problems.

FIG. 3 illustrates several examples of messages and their associated parameters which can be used to communicate information such as described above between the control nodes of FIGS. 1 and 2. The CellInfoChange message of FIG. 3 can be sent from a first control node to a neighboring control node when the first control node has changed data associated with one of its border cells or needs to send initial data associated with one of its border cells. The parameter CellID identifies the border cell of the sending control node, and the parameter NeighborCellID identifies the associated border cell of the receiving control node. The conventional parameters ChannelNo (e.g., broadcast control frequency) and DigitalVerificationColorCode (digital verification color code) are examples of new values for the cell of the sending control node, which new values need to be communicated to the receiving control node.

The SystemInfoChange message can be sent from one of the control nodes to all neighboring control nodes when the one control node has changed system data. The conventional parameters SID and NetworkType (network type) are examples of new system data values that the sending control node may need to transmit to its neighboring control nodes.

The AddNeighborCellRelation message can be used when one of the control nodes has (e.g., by any conventional means) decided to set up a new neighboring cell relationship between two neighboring border cells and wishes to communicate this new neighboring cell relationship to the neighboring control node. The parameter CellID identifies the border cell of the sending control node, and the parameter NeighborCellID identifies the neighboring border cell of the receiving control node.

The RemoveNeighborCellRelation message can be used when one of the control nodes has (e.g., by any conventional means) decided to remove an existing neighboring cell relationship between one of its border cells and a border cell of a neighboring control node. This decision is communicated to the neighboring control node using the RemoveNeighborCellRelation message. The parameter CellID identifies the border cell of the sending control node, and the parameter NeighborCellID identifies the neighboring border cell of the receiving control node.

Figure 4:
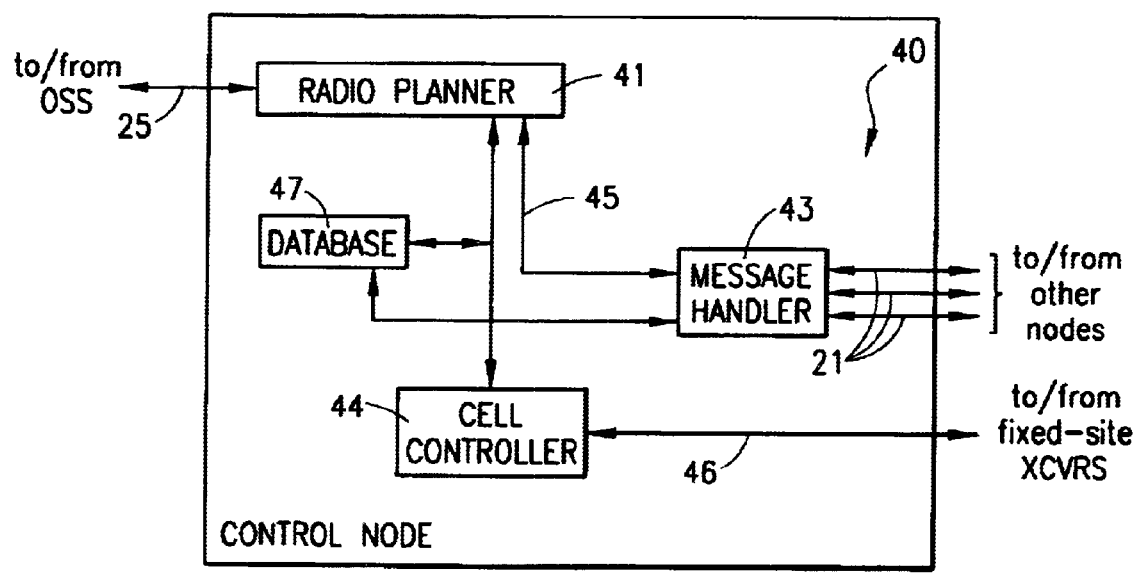
FIG. 4 illustrates diagrammatically exemplary portions of the control nodes of FIGS. 1 and 2 including a communications interface of the present invention.

FIG. 4 illustrates in more detail pertinent portions of an exemplary one of the control nodes of FIGS. 1 and 2. Included in the control node example of FIG. 4 is a communications interface 40 for interfacing to neighboring control nodes. The communications interface 40 includes a message handler 43 coupled to the communication links 21 of FIG. 2 and to a radio planning portion 41. The radio planning portion 41 determines when a message, for example one of the messages shown in FIG. 3, needs to be sent to another control node (or nodes), and then signals the message handler portion 43 via a signal path 45 coupled therebetween. The radio planner 41 can determine when a message needs to be sent, for example, by monitoring a radio planning algorithm executed locally therein, and/or by monitoring radio planning information received from a centralized radio planning algorithm in OSS.

The message handler portion 43 composes and sends the appropriate message(s) over the appropriate communication link(s) 21 to the desired control node(s). The radio planning portion 41 can, via signal path 45, identify to message handler 43 the information to be communicated and the desired recipient control node(s). The message handler 43 can immediately and automatically compose the appropriate message(s) and route it (them) to the appropriate link(s) 21. The message handler 43 also receives incoming messages from other control nodes, and updates an appropriate portion of a database 47 (conventionally maintained in conventional control nodes such as MSCs, BSCs, and local office network switches) with the information from the received messages. The message handler 43 can also receive messages from another control node and forward them to a third control node, so that, for example, control nodes 12 and 17 of FIG. 2 can communicate with one another via control node 10.

The example control node of FIG. 4 also includes a cell control portion 44 (which can be conventional) coupled at 46 for communication of control information to and from the fixed-site radio transceivers that define the various cells associated with the control node. The cell controller 44 is also coupled to radio planner 41 and database 47 for conventional cooperation therewith. The cell control portion 44 can thus control the operations of the associated cells in a conventional manner via input/output communication links at 46.

As mentioned above, because of the direct and immediate communication of relevant border cell information from one control mode to another, the radio planner 41 can perform, locally within the control node itself, adaptive frequency allocation (e.g., broadcast control frequencies) for its own border cells, and the frequency information can be communicated directly to the relevant neighbor control node(s). So, if the current frequency of a border cell is impossible or difficult to use, for example, due to interference, the control node itself can identify a preferable frequency, select it, and report this change directly to the relevant neighbor control node(s).

Figure 5:
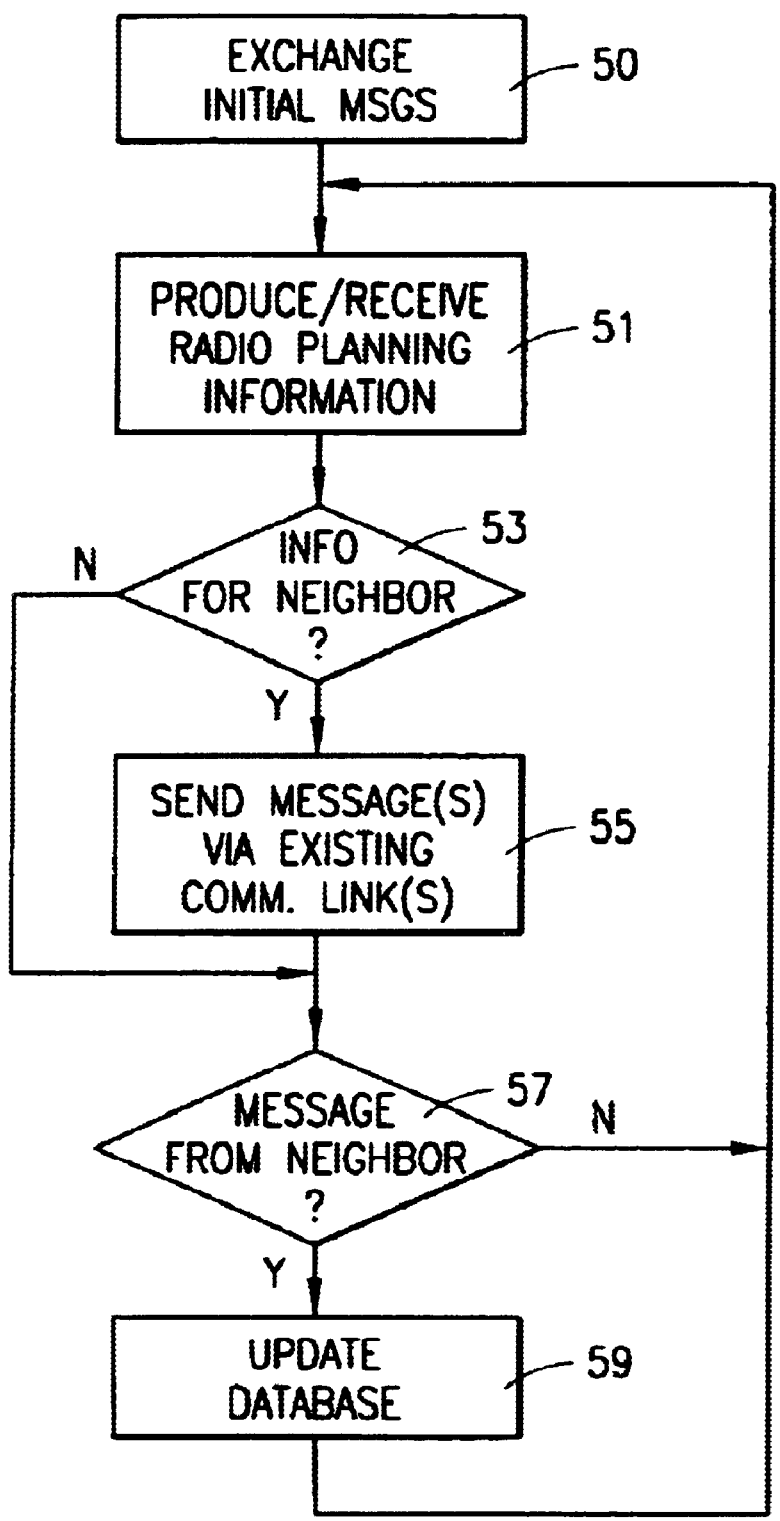
FIG. 5 illustrates in flow diagram format exemplary operations which can be performed by the control nodes illustrated in FIGS. 1, 2 and 4.

FIG. 5 illustrates exemplary operations which can be performed by the control nodes of FIGS. 1, 2 and 4. At 50, the control node uses the existing communication links 21 to exchange initialization messages with the neighboring control nodes. At 51, the radio planning portion 41 performs radio planning operations, for example, one or more adaptive frequency allocation algorithms, and/or receives similar radio planning information from a centralized source in OSS. It is determined at 53 whether the radio planning information involves border cells and should thus be provided to one or more neighboring control nodes. If so, then at 55 this radio planning information (for example, updated broadcast control channel frequency information) and the desired recipient control node information are provided by the radio planner 41 to the message handler 43, which composes an appropriate message (or messages) and then sends the message(s) to the neighboring control node(s) on the appropriate communication link(s) 21.

After sending the message(s) at 55, or if it has been determined at 53 that there is no information to be sent to neighboring control nodes, then at 57 it is determined whether or not the message handler 43 has received from another control node a message containing radio planning information. If not, then further radio planning information is awaited at 51. If a message has been received from another control node, then at 59 the message handler 43 updates database 47 with the information in this received message.

As clearly seen from the foregoing description, the invention permits control nodes such as MSCs, BSCs and local office network switches to execute radio planning algorithms (for example, adaptive frequency allocation algorithms) locally, and/or receive results of OSS-based algorithms, and immediately communicate relevant radio planning results to neighboring control nodes automatically, without involvement by the OSS or an operator. The automatic communication of radio planning information between control nodes permits border cell parameters such as broadcast control channel frequencies to be controlled and changed locally in the respective control nodes, without fear of inducing network problems. Moreover, because the control nodes communicate border cell information via existing, conventionally standardized communication links, the question of which operator or OSS is associated with a given control node or how that given control node communicates with its associated OSS is irrelevant to such communication of border cell information. The present invention thus advantageously permits localized planning in the control nodes even for border cells, and simple, immediate communication of border cell information among neighboring control nodes.

It will be evident to workers in the art that the invention described above can be readily implemented, for example, by suitable modifications in hardware, software or both in conventional control nodes such as, for example, MSCs, BSCs and local office network switches.

Although exemplary embodiments of the present invention have been described above in detail, this does not limit the scope of the invention, which can be practiced in a variety of embodiments.

What is claimed is:

1. A method of performing radio planning in a cellular communication network, comprising:

providing radio planning information including at least one frequency assignment for border cells in a first control node that controls a plurality of first fixed-site radio transceivers which define a plurality of first cells in the cellular communication network;

without network operator support, communicating the radio planning information including at least one frequency assignment for border cells from the first control node to a second control node that controls a plurality of second fixed-site radio transceivers which define in the cellular communication network a plurality of second cells including at least one said second cell that is located adjacent to at least one of the first cells;

receiving an incoming message from second control node;

updating a database responsive to the incoming message; and forwarding the incoming message to a third control node.

2. The method of claim 1, wherein said providing step includes the first control node executing a radio planning algorithm, and using the radio planning algorithm to produce the radio planning information including at least one frequency assignment for border cells.

3. The method of claim 1, wherein said providing step includes executing a radio planning algorithm externally of the first control node, and communicating the radio planning information including at least one frequency assignment for border cells to the first control node.

4. The method of claim 1, wherein said communicating step includes communicating the radio planning information including at least one frequency assignment for border cells to a plurality of control nodes that control respective pluralities of fixed-site radio transceivers which define in the cellular communication network respective pluralities of cells.

5. The method of claim 1, wherein said communicating step includes communicating said radio planning information including at least one frequency assignment for border cells from the first control node to the second control node immediately and automatically in response to said providing step.

6. The method of claim 1, including communicating radio planning information including at least one frequency assignment for border cells from the second control node to the first control node without network operator support.

7. The method of claim 6, including storing the radio planning information including at least one frequency assignment for border cells communicated from the second control node to the first control node in a database of the first control node.

8. In an apparatus for controlling a plurality of first fixed-site radio transceivers that define a plurality of first cells of a cellular communication network, an improvement comprising:

a communications interface for communicating radio planning information, said communications interface including an input for receiving the radio planning information, and further including an output for, without network operator support, communicating the radio planning information including at least one frequency assignment for border cells to a further apparatus that controls a plurality of second fixed-site radio transceivers that define in the cellular communication network a plurality of second cells including at least one said second cell that is located adjacent to at least one of said first cells; and a message handler coupled between said input and said output for providing a message at said output in response to said radio planning information including at least one frequency assignment for border cells received at said input, for receiving an incoming message from second control nodes, updating a database responsive to the incoming message, and forwarding the incoming message to a third control node.

9. The apparatus of claim 8, wherein said message handler is operable to produce any selected one of a plurality of possible messages in response to said radio planning information.

10. The apparatus of claim 8, wherein said output is for coupling to a communication link coupled to the further apparatus.

11. The apparatus of claim 8, including a radio planner coupled to said input of said communications interface for providing the radio planning information to said input.

12. The apparatus of claim 8, wherein said input of said communications interface is for receiving radio planning information including at least one frequency assignment for border cells from a source external to said apparatus.

13. The apparatus of claim 8, wherein said communications interface has a further input for receiving radio planning information including at least one frequency assignment for border cells from the further apparatus without network operator support.

14. The apparatus of claim 13, including a database coupled to said communications interface for storing therein the radio planning information including at least one frequency assignment for border cells received by said communications interface from the further apparatus.

15. The apparatus of claim 8, wherein said apparatus is a local office network switch and the cellular communication network is a local office network.

16. The apparatus of claim 8, wherein said apparatus is a base station controller and the cellular communication network is a GSM network.

17. The apparatus of claim 8, wherein said apparatus is a mobile services switching center, and wherein said cellular communication network is one of an AMPS network and a PDC network.

18. The apparatus of claim 8, wherein said output communicates the radio planning information including at least one frequency assignment for border cells to the further apparatus immediately and automatically in response to receipt of the radio planning information at said input.

19. The apparatus of claim 8, wherein said radio planning information includes information including at least one frequency assignment for border cells indicative of a neighboring cell relationship between the at least one first cell and the at least one second cell for facilitating handoff of a mobile station between the at least one first cell and the at least one second cell.

20. The apparatus of claim 19, wherein the radio planning information including at least one frequency assignment for border cells includes information indicative of one of establishment and removal of the neighboring cell relationship.

21. The apparatus of claim 8, wherein said radio planning information including at least one frequency assignment for border cells includes a control frequency used in the at least one first cell.

22. A method for radio planning in a cellular communications network, comprising the steps of:

determining at a first control node other than a network operator support node at least one of a frequency assignments and adaptive frequency allocation for cells supported by the first control node in the cellular communications network;

communicating, without support of a network operator support node, the at least one of the frequency assignment and the adaptive frequency allocation to a second control note supporting cells in the cellular communication network, wherein at least one of said cells supported by said first control node and at least one said cells supported by said second control node are adjacent;

receiving an incoming message from the second control node;

updating a database responsive to the incoming message; and forwarding the incoming message to a third control node.

23. A control node comprising:

means for providing radio planning information relating to at least one of frequency assignment and adaptive frequency allocation for cells supported by the control node;

means for providing messages to a second control node without network operator support, responsive to the radio planning information relating to at least one of frequency assignment and adaptive frequency allocation for cells supported by the control node;

means for receiving an incoming message from the second control node;

means for updating a database responsive to the incoming message; and means for forwarding the incoming message to a third control node.

24. A control node comprising:

a radio planner for providing radio planning information relating to a control node; and a message handler for providing messages to a second control node without t least one of frequency assignment and adaptive frequency allocation for cells supported by the network operator support responsive to the radio planning information relating to at least one of frequency assignment and adaptive frequency allocation for cells supported by the control node, for receiving an incoming message from second control nodes, updating the database responsive to the incoming message, and forwarding the incoming message to a third control node.

\* \* \* \* \*